(12) United States Patent
Craun et al.

(10) Patent No.: US 10,233,352 B2
(45) Date of Patent: Mar. 19, 2019

(54) PROCESS OR PREPARING ORGANIC SOLVENT-BASED DISPERSIONS, COATING COMPOSITIONS AND COATED METAL SUBSTRATE USEFUL FOR PACKAGING APPLICATIONS

(71) Applicant: Akzo Nobel Coatings International B.V., Arnhem (NL)

(72) Inventors: Gary Pierce Craun, Berea, OH (US); Riaz Ahmad Choudhery, Solihull (GB); Daniel Bode, Cleveland, OH (US); Patrice Simon, Bourg-Achard (FR); Jude Thomas Rademacher, Akron, OH (US); Laurent Mialon, Saint Galmier (FR)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/534,132

(22) PCT Filed: Dec. 21, 2015

(86) PCT No.: PCT/EP2015/080769
§ 371 (c)(1),
(2) Date: Jun. 8, 2017

(87) PCT Pub. No.: WO2016/107779
PCT Pub. Date: Jul. 7, 2016

(65) Prior Publication Data
US 2017/0369733 A1    Dec. 28, 2017

Related U.S. Application Data

(60) Provisional application No. 62/098,473, filed on Dec. 31, 2014, provisional application No. 62/098,489, filed on Dec. 31, 2014, provisional application No. 62/098,499, filed on Dec. 31, 2014, provisional application No. 62/098,502, filed on Dec. 31, 2014, (Continued)

(51) Int. Cl.
| | |
|---|---|
| *C08L 67/00* | (2006.01) |
| *C08K 7/16* | (2006.01) |
| *C08G 63/695* | (2006.01) |
| *C08G 63/82* | (2006.01) |
| *B32B 15/09* | (2006.01) |
| *C09D 167/02* | (2006.01) |
| *C08G 81/00* | (2006.01) |
| *C08J 3/11* | (2006.01) |
| *C08G 69/14* | (2006.01) |
| *C08L 77/02* | (2006.01) |
| *C08J 3/24* | (2006.01) |
| *C08K 3/32* | (2006.01) |
| *C08K 5/5435* | (2006.01) |
| *C08K 5/544* | (2006.01) |
| *C08L 51/06* | (2006.01) |

(52) U.S. Cl.
CPC ....... *C09D 167/02* (2013.01); *C08G 63/6956* (2013.01); *C08G 69/14* (2013.01); *C08G 81/00* (2013.01); *C08J 3/11* (2013.01); *C08J 3/247* (2013.01); *C08K 3/32* (2013.01); *C08K 5/544* (2013.01); *C08K 5/5435* (2013.01); *C08L 51/06* (2013.01); *C08L 77/02* (2013.01); *C08G 2270/00* (2013.01); *C08G 2390/40* (2013.01); *C08J 2367/02* (2013.01); *C08J 2423/26* (2013.01); *C08K 2003/329* (2013.01)

(58) Field of Classification Search
USPC ........ 523/223; 524/504, 588; 428/35.7, 447, 428/458
See application file for complete search history.

(56) References Cited

U.S. PATENT DOCUMENTS

| | | | |
|---|---|---|---|
| 4,848,293 | A | 7/1989 | Hitoshi et al. |
| 4,849,293 | A | 7/1989 | Koga et al. |
| 4,990,383 | A | 2/1991 | Bergstrom et al. |

(Continued)

FOREIGN PATENT DOCUMENTS

| | | |
|---|---|---|
| EP | 457351 | 11/1991 |
| EP | 457351 A2 | 11/1991 |

(Continued)

OTHER PUBLICATIONS

Database WPI Week 200469 Thomson Scientific, London, GB; AN 2004-703037, XP002753749 (2004), 2 pages.
C et al., "New Coupling Agents for Metal Substrates ! New Coupling Agents for Vapor Phase Deposition ! New Coupliing Agents for Proteins !", Jan. 1, 2006, XP055096546, Retrieved from the Internet: url:http://www.gelest.com/goods/pdf/couplingagents.pdf [retrieved on Jan. 15, 2014] pp. 17, 37.

(Continued)

*Primary Examiner* — Tae H Yoon
(74) *Attorney, Agent, or Firm* — McDonnell Boehnen Hulbert & Berghoff LLP

(57) ABSTRACT

The invention relates to a process for preparing an organic solvent-based dispersion comprising a melt-blended network of an epoxy-functional and/or amino-functional polymer having a polymer-O—Si—O-polymer linkage and a polyolefin (co)polymer having carboxylic acid and/or carboxylic acid anhydride groups, the process comprising the steps of a) forming the melt-blended network from a prepolymer, a silane-functional compound and the polyolefin (co)polymer in the absence of a solvent, b) mixing the melt-blended network with an organic solvent to make the organic solvent-based dispersion, and c) cooling the organic solvent-based dispersion. The invention further relates to a coating composition and to a coated metal substrate.

14 Claims, No Drawings

Related U.S. Application Data provisional application No. 62/098,510, filed on Dec. 31, 2014.

(56) References Cited

U.S. PATENT DOCUMENTS

| | | | |
|---|---|---|---|
| 8,144,929 B2 | 3/2012 | Takahashi et al. | |
| 8,178,630 B2 | 5/2012 | Koschabek et al. | |
| 9,828,522 B2 * | 11/2017 | Argyropoulos | C08G 63/199 |
| 2007/0213472 A1 | 9/2007 | Kim et al. | |
| 2008/0090949 A1 * | 4/2008 | Nagao | B41M 5/5245 |
| | | | 524/401 |
| 2013/0149453 A1 * | 6/2013 | Romick | C09D 151/06 |
| | | | 427/385.5 |

FOREIGN PATENT DOCUMENTS

| | | |
|---|---|---|
| JP | 2001 011391 A | 1/2001 |
| JP | 2001-011391 A | 1/2001 |
| JP | 2004-269679 A | 9/2004 |
| JP | 2004 269679 A | 9/2004 |
| KR | 2013-0141471 A | 12/2013 |
| WO | 94/14915 A1 | 7/1994 |
| WO | WO 94/14915 | 7/1994 |
| WO | 98/31719 A1 | 7/1998 |
| WO | WO 98/31719 | 7/1998 |
| WO | 08/135217 A1 | 11/2008 |
| WO | WO 2008/135217 | 11/2008 |
| WO | 2012/044455 A1 | 4/2012 |
| WO | 13/092539 A1 | 6/2013 |
| WO | 13/092541 A1 | 6/2013 |
| WO | WO 2013/092539 | 6/2013 |
| WO | WO 2013/092541 | 6/2013 |

OTHER PUBLICATIONS

International Search Report and Written Opinion dated Feb. 10, 2016 for International Application No. PCT/EP2015/080769 filed Dec. 21, 2015, 13 pages.

XP002753749, Database WPI, Week 200469, Thomson Scientific, 2004, 2 pages, cited in International Search Report issued in PCT/EP2015/080769 dated Feb. 10, 2016.

XP055096546, "Silane Coupling Agents: Connecting Across Boundaries", Gelest Inc., 2006, 62 pages, retrieved from the Internet: URL:http://www.gelest.com/goods/pdf/couplingagents.pdf [retrieved on Jan. 15, 2014] relevant pp. 17,37.

* cited by examiner

PROCESS OR PREPARING ORGANIC SOLVENT-BASED DISPERSIONS, COATING COMPOSITIONS AND COATED METAL SUBSTRATE USEFUL FOR PACKAGING APPLICATIONS

This is the US national phase under 35 U.S.C. § 371 of international application PCT/EP2015/080769, filed Dec. 21, 2015, which claims priority to U.S. provisional application 62/098,473, filed Dec. 31, 2014, U.S. provisional application 62/098,489, filed Dec. 31, 2014, U.S. provisional application 62/098,499, filed Dec. 31, 2014, U.S. provisional application 62/098,502, filed Dec. 31, 2014, and U.S. provisional application 62/098,510, filed Dec. 31, 2014.

FIELD OF THE INVENTION

The current invention relates to organic solvent-based dispersions and coating compositions especially useful for the protection of metal food and beverage containers and for heat seal applications for food and beverage containers.

BACKGROUND OF THE INVENTION

Metal food and beverage containers, such as cans and lidded trays, are usually coated on the inside to prevent reaction between the contents of the container and the metal. Such reactions can lead to both unwanted deterioration of the metal container and to damaging effects on the contents of the container, particularly in terms of changes in quality and taste.

Coating compositions for the interior of metal food and beverage containers are often applied to flat metal by roller coating before the flat metal is formed into the container. The coating is dried and/or cured before the metal is shaped into the form of a container. The containers are usually formed by a drawing process before being filled with food or a beverage. The coating compositions need to have very good flexibility, adhesion, sterilization resistance, stability properties and blush resistance. Flexibility and adhesion are very important if the coating composition is to remain intact during the container formation process when the coated metal is shaped into a container.

When the containers are filled with food or a beverage, the contents of the container are usually sterilized by heating the sealed container to a temperature of 120° C. to 140° C. for 10 to 90 minutes. The cured coating is then in direct contact with the contents of the container for a considerable period of time, which during storage can be for many years. During sterilization and storage, the coating is required to maintain its integrity to prevent corrosion of the metal and to prevent migration of the metal into the contents of the container. The coating must also not impair the contents of the container by releasing unwanted material or by altering the flavor or appearance of the contents. These properties impact not only the shelf life of the product but also public health and safety. Thus, there are particularly stringent and specific requirements for coating compositions for the interior of containers that hold food and beverages.

In some applications, coating compositions are used to bond the lid to the body of the container. For example, pet food containers can be provided in a tray with a thin, full length aluminum lid. The lid is attached to the tray by means of a coating composition, usually crosslinked, which on the application of heat and pressure forms an adhesive bond or seal between the lid and the tray. The contents of the container are accessed by simply peeling back the flexible aluminum lid which in turn breaks the seal and the coating composition. This is known as an easy-open end of a container. The strength of the seal is very important. It must be strong enough to survive the manufacturing and filling processes, yet not be so strong that breaking the seal becomes difficult.

In many applications, coating compositions that contact food or beverages are applied as very thin films to produce dried films of no more than 10 μm. In such circumstances, the coating compositions must be free of particulate matter greater than this size. Polymer dispersions are often used to formulate such coating compositions, but unfortunately polymer dispersions sometimes contain particles too large to be suitable for very thin films. Also, coating compositions derived from polymer dispersions are sometimes uneven with rough surfaces and poor adhesion and protective properties.

A further overall desire in the field is to reduce the number of coating layers and to ideally use monolayer coatings. If the desired properties for a particular application can be achieved with a single coating layer, this has preference over multilayer coating systems as the former results in a faster and simpler coating process and lower costs.

SUMMARY OF THE INVENTION

In order to address at least one of the foregoing desires, the present invention provides, in one aspect, a process for preparing an organic solvent-based dispersion comprising a melt-blended network of an epoxy-functional and/or amino-functional polymer having a polymer-O—Si—O-polymer linkage and a polyolefin (co)polymer having carboxylic acid and/or carboxylic acid anhydride groups, the process comprising the steps of a) forming the melt-blended network from a prepolymer, a silane-functional compound and the polyolefin (co)polymer in the absence of a solvent, b) mixing the melt-blended network with an organic solvent to make the organic solvent-based dispersion, and c) cooling the organic solvent-based dispersion.

In another aspect, the present invention provides an organic solvent-based coating composition comprising a) the organic solvent-based dispersion obtainable by the process according to the invention, b) a film-forming polymer, c) a crosslinker, and d) an acid catalyst.

In yet another aspect, the present invention provides a metal substrate coated with the coating composition according to the invention.

DETAILED DESCRIPTION OF THE INVENTION

In a first aspect, the present invention provides a process for preparing an organic solvent-based dispersion, which comprises a melt-blended network of an epoxy-functional and/or amino-functional polymer having a polymer-O—Si—O-polymer linkage and a polyolefin (co)polymer having carboxylic acid and/or carboxylic acid anhydride groups.

Step (a) of the process includes forming the melt-blended network from a prepolymer, a silane-functional compound and a polyolefin (co)polymer, in the absence of a solvent. The prepolymer, the silane-functional compound and the polyolefin (co)polymer can be melt blended in different orders, or simultaneously.

In some embodiments, the melt blending step is performed by first melt blending the prepolymer and the silane-functional compound to form a silane-functional polymer, cooling the silane-functional polymer, then melt blending the cooled silane-functional polymer with the polyolefin (co)polymer to form the melt-blended network. The silane-functional polymer can be prepared by chain extending the prepolymer with the silane-functional compound. Chain extending can be conducted using conventional polymerization techniques known in the art. If a hydroxyl-functional prepolymer is used and the silane-functional compound contains alkoxy group(s), during chain extending the alkoxy group(s) of the silane-functional compound will react with the hydroxyl groups of the prepolymer producing an alcohol and a polymer-O—Si—O-polymer linkage.

In some embodiments, the melt blending step is performed by first melt blending the polyolefin (co)polymer and the silane-functional compound to form a first melt-blended product, cooling the first melt-blended product, then melt blending the cooled first melt-blended product with the prepolymer to form the melt-blended network.

In some embodiments, the melt blending step is performed by simultaneously melt blending the prepolymer, the polyolefin (co)polymer and the silane-functional compound to form the melt-blended network.

The melt blending step is performed in the absence of a solvent. Melt blending implies that the polymers in the mixture are present as a melt, which implies the use of elevated temperatures. The employed temperatures can generally be in the range 100-250° C., preferably in the range 130-200° C., more preferably 150-180° C. Any melt-blending equipment can be used which is suitable for treating a molten viscous mass. In some embodiments, melt blending takes place under conditions of high shear such as in an extruder to form the melt-blended product. Such product is also referred to as an extrudate. The particles of the melt-blended product may optionally be broken into smaller particles.

In step (b) the melt-blended network is mixed with an organic solvent to make the organic solvent-based dispersion. In some embodiments, this step is performed at an elevated temperature, preferably in the range 50-90° C., more preferably in the range 65-85° C. If an extruder is used in step (a), the melt-blended product can be directly extruded into the organic solvent. In an alternative embodiment, it may be preferred to first extrude the melt-blended product, optionally cool it down, and then disperse it in the organic solvent.

Suitable organic solvents for preparing the dispersion include hydrocarbons, ketones, esters, ethers and/or alcohols. Also mixtures of solvents can be used. In some embodiments, the organic solvent is an aromatic hydrocarbon, preferably such as benzene, naphthalene, and substituted derivatives thereof, such as toluene and xylene. Other examples of suitable solvents include glycols, and ethers and esters thereof, such as propylene glycol methyl ether acetate (PMA).

In step (c), the organic solvent-based dispersion is cooled. The cooling is preferably done to ambient temperature or to a temperature suitable for filtration. By ambient temperature typically a temperature of 15-30° C. is meant, preferably in the range 20-25° C. Cooling can be effected in a passive way such as by allowing the product to cool, or as an active step, e.g. by using a water bath or other active cooling means.

The mean particle size of the melt-blended network particles in the dispersion can for example have a lower limit of 2 μm, 3 μm or 4 μm, and an upper limit of 8 μm, 7 μm, 6 μm or 5 μm. In some embodiments, the preferred mean particle size is from 4 to 6 μm, more preferably about 5 μm. The mean particle size is measured as $D_{90}$ using laser diffraction with a Malvern Mastersizer™ 2000.

Prepolymer

The prepolymer is a polymeric precursor for the melt-blended network. In some embodiments, the prepolymer comprises a polyester polymer, a polycarbonate polymer, a polyether polymer, a poly(meth)acrylate polymer, a copolymer of (meth)acrylic acid, a (meth)acrylic acid or its ester, a polyurethane, any other hydroxyl-functional polymer, or a combination thereof. The prepolymer may have hydroxyl functionality and/or acid functionality. Preferably, the prepolymer has hydroxyl functionality.

Preferably, the prepolymer is a polyester, preferably having a hydroxyl functionality. Polyesters can be prepared by known condensation and/or addition reactions of building blocks having ester-forming functional groups. Examples of ester-forming functional groups are carboxylic acid groups, (cyclic) carboxylic anhydride groups, carboxylic ester groups, hydroxy groups, epoxide groups, oxetane groups, and lactone groups. In order to form a polyester, at least a part of the building blocks used must have a functionality of at least 2. However, monofunctional and tri- or higher-functional building blocks can be used as well. In some embodiments it can be useful to prepare polyesters by alcoholic transesterification.

The building block with the hydroxyl functionality is for example a polyol, and suitably a diol. The diol may comprise for example a linear, cyclic, or branched aliphatic diol, an aliphatic or aromatic ether glycol, ethylene glycol, 1,2-propanediol, 1,3-propanediol, 2-methyl-1,3-propanediol, 2,2-dimethyl-1,3-propanediol, 2,2,4-trimethyl-1,3-pentanediol, 2-butyl-2-ethyl-1,3-propanediol, 3-hydroxy-2,2-dimethylpropyl 3-hydroxy-2,2-dimethyl propanate, 1,3-butylene glycol, 1,4-butanediol, 3-methyl-1,5-pentanediol, 1,6-hexanediol, 1,2-cyclohexanediol, 2,2-dimethyl heptanediol, 2,2-dimethyl octanediol, diethylene glycol, triethylene glycol, dipropylene glycol, tripropylene glycol, polyethylene glycol, diethylene ether glycol, poly(ethylene ether) glycol, and combinations thereof. The reaction mixture may if desired contain minor amounts of monofunctional alcohols or minor amounts of tri- or higher-functional alcohols, including but not limited to 2-ethylhexyl alcohol, 2-cyclohexyl ethanol, 2,2-dimethyl-1-propanol, lauryl alcohol, benzyl alcohol, cyclohexanol, glycerol, trimethylol propane, trimethylol ethane, di-trimethylol propane, pentaerythritol, dipentaerythritol, tripentaerythritol, and combinations thereof. The prepolymer can be prepared by polymerizing one or more diols and one or more diacids using conventional polymerization techniques known in the art. The reaction mixture may also include polyols, alcohols, monoacids and/or polyacids, as is known to those skilled in the art. In some embodiments, the diol is present in an amount of 5 to 95 wt. % of the prepolymer.

Preferably, the diol is a cyclic diol. In some embodiments, a monocyclic diol is used. Examples include cyclohexane dimethanol (CHDM), hydroquinone bis(2-hydroxyethyl) ether, a monocyclic sugar, or a combination thereof. In certain embodiments, the monocyclic diol is CHDM. In some embodiments, the monocyclic diol is present in an amount of 1 to 95 wt. % of the prepolymer.

In some embodiments, the diol is a polycyclic diol. The polycyclic diol may be saturated or unsaturated. Suitable examples include tricyclodecane dimethanol (TCDDM), isosorbide, isomannide, isoidide, 2,2,4,4-tetramethyl-1,3- cyclobutanediol, 2-methyl-1,3 propane diol, 2,2-bis-(p-hydroxycyclohexyl)-propane, 5-norbornene-2,2-dimethylol, 2,3-norbornene diol, or a combination thereof. In certain embodiments, the polycyclic diol is TCDDM. In some embodiments, the polycyclic diol is present in an amount of 5 to 95 wt. % of the prepolymer.

In some embodiments, a monocyclic diol and a polycyclic diol are simultaneously used to form the prepolymer. In some embodiments, the prepolymer is a polyester prepared by polymerizing a monocyclic diol and a saturated polycyclic diol as the polyol.

The building block with carboxyl functionality may comprise for example a polycarboxylic acid, a dicarboxylic acid, polycarboxylic acids having higher acid functionality, or an anhydride, precursor or derivative thereof. Preferably, diacids or their anhydrides are used. Examples thereof include maleic acid, fumaric acid, succinic acid, adipic acid, phthalic acid, tetrahydrophthalic acid, methyltetrahydrophthalic acid, hexahydrophthalic acid, methylhexahydrophthalic acid, kendomethylenetetrahydrophthalic acid, azelaic acid, sebacic acid, isophthalic acid, 1,12 dodecanedioic acid, trimellitic acid, terephthalic acid, naphthalene dicarboxylic acid, cyclohexane dicarboxylic acid, glutaric acid, dimer fatty acids, anhydrides or derivatives thereof, an adduct of a diacid, a monofunctional compound, or a combination thereof. In some embodiments, the building block with carboxyl functionality is present in an amount of 5 to 95 wt. % or 30 to 70 wt. % of the prepolymer.

In some embodiments, the polyester prepolymer is prepared using stoichiometric amounts of polyols and polyacids.

In some embodiments, the prepolymer comprises an epoxy-functional polymer with a hydroxyl functionality, preferably an epoxy-functional polyester. A suitable example is glycidoxy polyester.

The prepolymer may be present for example in an amount from 40 to 90 wt. %, from 60 to 80 wt. %, or from 60 to 70 wt. % of the melt-blended product.

The prepolymer typically has a weight-average molecular weight of 200 to 20,000 Daltons or 400 to 3,000 Daltons, measured by GPC using polystyrene as standard.

Silane-functional Compound and Polymer

The silane-functional compound useful in the present invention may comprise an epoxy-silane-functional compound, an amino-silane-functional compound, or a combination thereof.

If the prepolymer contains hydroxyl functionality, the silane-functional compound will react with the hydroxyl functionality in the prepolymer, producing an alcohol to produce an epoxy-functional and/or amino-functional silane polymer comprising a polymer-O—Si—O-polymer linkage. As this reaction proceeds, the viscosity of the prepolymer usually increases. At 150° C. for example, the viscosity can be from 20 to 500 poise.

In certain embodiments, epoxy functionality is provided to the epoxy-functional silane compound via a linear or branched, substituted or unsubstituted carbon chain attached to the silicon atom, such as when using the epoxy-functional silane compound CoatOSil® 2287 commercially available from Momentive (3-glycidoxypropylmethyldiethoxysilane).

The epoxy-functional silane compound and the amino-functional silane compound may include, for example, an ethoxysilane compound, a diethoxysilane compound and/or a triethoxysilane compound, such as glycidoxypropylmethyldiethoxysilane, glycidoxypropylmethyldimethoxysilane, trimethoxysilylpropyl methacrylate, methacryloxypropyltrimethoxysilane, glycidyloxypropyltriethoxysilane, glycidyloxypropyltrimethoxysilane, amino-ethylaminopropyltrimethoxysilane, vinyltriethoxysilane, tetramethoxysilane, tetraethoxysilane, methyltrimethoxysilane, bis(3-triethoxysilylpropyl)amine, bis(3-trimethoxysilylpropyl)amine, aminopropylmethyldiethoxysilane, aminopropyltriethoxysilane, aminopropyltrimethoxysilane, benzylaminoethylamino-propyltrimethoxysilane, or a combination thereof. In certain embodiments, the epoxy-functional silane compound is a diethoxysilane compound. Another suitable example is glycidoxypropylethoxymethylsilane (GPDEMS).

In some embodiments, the epoxy-functional silane compound and/or the amino-functional silane compound is present in a weight ratio of 10/90 to 95/5 of the polyolefin (co)polymer.

After chain extending the prepolymer with a silane-functional compound, the epoxy-functional and/or amino-functional polymer comprising a polymer-O—Si—O-polymer linkage typically has a weight-average molecular weight of 500 to 50,000 Daltons or from 1000 to 30,000 Daltons or from 1,500 to 20,000 Daltons, as measured by GPC, using polystyrene as standard.

In some embodiments, the silane-functional polymer is an epoxy-silane-functional polyester polymer.

Polyolefin (Co)Polymer

The polyolefin (co)polymer has carboxylic acid groups and/or carboxylic acid anhydride groups. The carboxylic acid and/or anhydride groups of the polyolefin (co)polymer can be unsaturated carboxylic acid anhydrides, such as for example maleic acid, (meth)acrylic acid, itaconic acid, succinic acid, or their anhydrides, or a combination thereof.

As used herein the term "polyolefin (co)polymer" includes ethylene homopolymers such as low density polyethylene, high density polyethylene and polypropylene, olefin copolymers such as copolymers of ethylene and propylene, ethylene and higher alkenes, such as linear low density polyethylenes, and mixtures of the above homopolymers or copolymers. The ratio of propylene to ethylene in the polyolefin (co)polymer may be from 98 to 2, from 95 to 5, from 90 to 10, from 80 to 20, from 70 to 30, or greater.

The carboxylic acid groups and/or carboxylic acid anhydride groups can be introduced into the polyolefin (co)polymer by copolymerization of polyolefin monomers with carboxyl acid or carboxyl acid anhydrides, or by subsequent modification of the polyolefin (co)polymer with the corresponding groups (e.g. grafting).

In both cases, suitable examples of polyolefins include copolymers of ethylene, propylene and/or butylene. Examples of carboxylic acids include in both cases (meth)acrylic acid, maleic acid, itaconic acid, succinic acid, or a combination thereof, e.g. (meth)acrylic acid.

Particular examples include a copolymer of (poly)propylene and maleic anhydride, a copolymer of propylene, ethylene and maleic anhydride, a copolymer of a polybutylene compound, a copolymer of acid-functional polyolefin compounds, a copolymer of (meth)acrylic acid and ethylene and/or propylene, or a combination thereof.

In some embodiments, the polyolefin (co)polymer has a weight average molecular weight of 30,000 to 200,000 Daltons, 40,000 to 150,000 Daltons, 45,000 to 130,000 Daltons, or 45,000 to 100,000 Daltons, as measured by GPC. When the molecular weight of the polyolefin (co)polymer is below 30,000 Daltons, the polyolefin (co)polymer might have low mechanical strength and form a weak seal after the coating is cured. When the molecular weight of the polyolefin (co)polymer is above 200,000, the polyolefin (co) polymer might have a high melt viscosity and be difficult to process, even under very high shear in an extruder.

The carboxylic acid groups and/or acid anhydride groups may provide the polyolefin (co)polymer with an acid value from 2 to 50 mg KOH/g, from 2 to 30 mg KOH/g, or from 2 to 20 mg KOH/g. When the acid value is below 2 mg KOH/g, the particle size of the polyolefin (co)polymer might be too coarse, forming an unstable dispersion with sediment that cannot be easily redispersed. In addition, adhesion of the coating composition to the substrate might be poor.

The polyolefin (co)polymer may be functionalized by grafting unsaturated carboxylic acid-containing compounds, such as maleic anhydride. The grafting levels can be from 0.1 to 20%, 0.2 to 10%, 0.3 to 8%, or 0.4 to 5%, which are calculated as a weight percentage based on the weight before grafting.

Preferably, the polyolefin (co)polymer comprises 1% or less by weight of the carboxylic acid and/or anhydride (e.g. maleic anhydride). In some embodiments, the carboxylic acid and/or anhydride level is below 0.8% of the polyolefin (co)polymer, which equates to an acid value of 2 to 8 mg KOH/gram of copolymer.

The polyolefin (co)polymer may be present for example in an amount from 5 to 50 wt. %, from 10 to 40 wt. %, or from 30 to 40 wt. % of the melt-blended product.

Coating Composition

The organic solvent-based dispersion comprising the melt-blended network as described herein-above can be further used as a component of a coating composition. Such organic solvent-based coating composition further comprises a film-forming polymer, a crosslinker and an acid catalyst.

Suitable film-forming polymers can be those typically used for food and beverage coating applications. Particularly preferred are polyester polymers. The film-forming polymers may have functional groups such as oxirane, hydroxyl, amine and isocyanate groups. The film-forming polymers may be present for example in an amount up to 70 wt. % or up to 40 wt. % of the melt-blended product.

The crosslinker in some embodiments may comprise a phenolic resin, a benzoguanamine compound, phenol formaldehyde, a cresol, or a combination thereof. In certain embodiments, the crosslinker comprises a phenolic resin, such as Phenodur PR521/60B, Bakelite PF 6535LB, or a combination thereof. In some embodiments, the crosslinker is present in an amount of 2 to 35 wt. %, 2 to 25 wt. %, or 10 to 20 wt. % of the mixture to be crosslinked. Additional crosslinkers may be present and selected depending on the functional groups in the mixture to be crosslinked. Such additional crosslinkers may include an amino resin, a melamine-formaldehyde resin, a urea-formaldehyde resin, an acid-functional resin, an acrylic resin, an anhydride resin, a blocked or unblocked isocyanate, a polyphenol, a polyamine, or a combination thereof.

The acid catalyst can comprise phosphoric acid or a sulfonic acid such as dodecylbenzene sulfonic acid, as well as combinations thereof, such as an 80/20 blend of phosphoric acid in butanol. In certain embodiments, the acid catalyst comprises or is phosphoric acid. The acid catalyst may be present for example in an amount from 0.3 to 2 wt. %, preferably 0.7 to 1.5 wt. % of the coating composition.

The mean particle size of the particles in the organic solvent-based coating composition is preferably from 4 to 6 µm.

The coating composition can be prepared by blending the organic solvent-based dispersion with the film-forming polymer, the crosslinker and the acid catalyst. The blending can be effected before or after cooling the organic solvent-based dispersion.

Applications

The coating compositions according to the present invention can be used to form a protective coating for a substrate. The coating compositions may be applied to a substrate and heated to crosslink the coating compositions. Preferably, the substrate is a metal substrate.

Accordingly, the present invention further provides a metal substrate coated with a coating composition according to the invention. In some embodiments, the substrate is a metal container suitable to hold food or a beverage, such as for example, an easy-open end of a food container.

One of the unexpected aspects of the current invention is that the coating compositions can be the only coating compositions applied directly or indirectly (meaning no base coats, top coats, or intermediate coating layers are present) to a metal substrate, meaning there are no other coating compositions being applied or cured on the substrate to produce the final coated substrate.

This is particularly beneficial when the coating compositions are used to coat the easy-open ends of food containers, because conventional coating systems for the easy-open ends of food containers require a base coat to provide adhesion and a top coat to provide flexibility, where the base coat must be applied and cured before the top coat is applied and cured.

Compared to conventional coating systems that require the application of multiple coating layers, the coating compositions according to the present invention can be used as the only dispersion or coating layer to produce coated containers, which results in less coating and curing time, with less cost and with less energy. Of course, additional coating layers can be applied if desired.

The coating compositions of the invention preferably are at least substantially free, more preferably completely free, of mobile BPA (bisphenol A), BPF (bisphenol F), and aromatic glycidyl ethers (such as BADGE (bisphenol A diglycidyl ether), BFDGE (bisphenol F diglycidyl ether) and NOGE (novolac glycidyl ether)). There is a perception that coating compositions having BPA, BPF and/or aromatic glycidyl ethers are undesirable for food and beverage contact applications.

Where in the present description different aspects of the invention are described, also combinations of the aspects are included. Some particular embodiments according to the present invention are described herein-below.

In some embodiments, the invention provides an organic solvent-based dispersion comprising a melt-blended network of an epoxy-functional and/or amino-functional polymer having a polymer-O—Si—O-polymer linkage and a polyolefin (co)polymer having carboxylic acid and/or carboxylic acid anhydride groups, wherein the organic solvent-based dispersion is prepared by a) chain extending a prepolymer with a silane-functional compound to form a silane-functional polymer, b) melt blending the silane-functional polymer with the polyolefin (co)polymer in the absence of a solvent to form the melt-blended network, c) mixing the melt-blended network with an organic solvent to make the organic solvent-based dispersion, and d) cooling the organic solvent-based dispersion.

In some embodiments, the invention provides an organic solvent-based dispersion comprising a melt-blended network of an epoxy-functional and/or amino-functional polymer having a polymer-O—Si—O-polymer linkage and a polyolefin (co)polymer having carboxylic acid and/or carboxylic acid anhydride groups, wherein the organic solvent-based dispersion is prepared by a) melt blending a prepolymer, a silane-functional compound and the polyolefin (co)

polymer in the absence of a solvent to form the melt-blended network, b) mixing the melt-blended network with an organic solvent to make the organic solvent-based dispersion, and c) cooling the organic solvent-based dispersion.

In some embodiments, the invention provides an organic solvent-based coating composition comprising a polyester polymer and a melt-blended network of an epoxy-functional and/or amino-functional polymer having a polymer-O—Si—O-polymer linkage and a polyolefin (co)polymer having carboxylic acid and/or carboxylic acid anhydride groups, wherein the organic solvent-based coating composition is prepared by a) chain extending a prepolymer with a silane-functional compound to form a silane-functional polymer, b) melt blending the silane-functional polymer with the polyolefin (co)polymer in the absence of a solvent to form the melt-blended network, c) mixing the melt-blended network with an organic solvent to make a dispersion, d) blending the dispersion with the polyester polymer, a phenolic resin and an organic acid catalyst to form the organic solvent-based coating composition, and e) cooling the composition.

In some embodiments, the invention provides an organic solvent-based coating composition comprising a polyester polymer and a melt-blended network of an epoxy-functional and/or amino-functional polymer having a polymer-O—Si—O-polymer linkage and a polyolefin (co)polymer having carboxylic acid and/or carboxylic acid anhydride groups, wherein the organic solvent-based coating composition is prepared by a) melt blending a prepolymer, a silane-functional compound and the polyolefin (co)polymer in the absence of a solvent to form the melt-blended network, b) mixing the melt-blended network with the an organic solvent to make a dispersion, c) blending the dispersion with the polyester polymer, a phenolic resin and an organic acid catalyst to form the organic solvent-based coating composition, and d) cooling the composition.

EXAMPLES

The invention will now be illustrated by the following, non-limiting examples. In the present description and claims, the percentages and ratios are by weight unless otherwise specified.

Example 1

Organic-solvent-based dispersions were prepared using a Leistritz micro 18 GL 40D twin screw extruder. The following components were used.

As epoxy-functional silane, CoatoSil MP 200 available from Momentive Performance Materials Incorporated was used. As polyolefin (co)polymer, polypropylene copolymer (PPMah) Fusabond M613-05 was used, which is a maleic anhydride-modified polypropylene copolymer from E. I. du Pont de Nemours Company. As prepolymer, different polyesters were used as described herein-below.

Polyester 1 is Dynapol L651—a polyester with a hydroxyl value of about 5 mg KOH/g available from Evonik Industries.

Polyester 2 is a polyester prepared from neopentyl glycol, terephthalic acid, isophthalic acid, adipic acid and trimellitic anhydride with an acid value of 40 mgKOH/g, a Tg between 62-67° C. and an ICI Cone & Plate viscosity at 200° C. of 50-70 Poise.

Polyester 3 is a hydroxyl-functional polyester available from Helios Group and has a Mn of about 4,000 Daltons and Mw of about 21,000 Daltons.

Polyester 4 is an epoxy silane-functionalized polyester prepared using the following procedure. 1,442 grams of Unoxol diol (1,3/1,4-CHDM), 664.5 grams of isophthalic acid, 664.5 grams of terephthalic acid and 0.7 grams of butylstanoic acid were slowly heated to 240° C. in a 5 liter flask equipped with a nitrogen blanket, paddle stirring and a compound column (a 6 inch glass section packing above a 12 inch vigreux column). The column head temperature was maintained below 98° C. Distillation water was collected (about 300 ml). When the column head temperature dropped below 70° C., the carrier solvent was switched to xylene with a Dean Stark trap. Enough xylene was added to maintain reflux at 240° C. and continued to an acid number less than 1.0 mg KOH/g. The polyester was cooled to 140° C. and 330.7 grams of glycidoxy propyldiethoxymethylsilane (GPDEMS) were added followed by 20 grams of tetra-isopropyl titanate (TIPT). Ethanol was collected at a 140° C. pot temperature as it refluxed with the overhead connected directly to the flask. As the reflux slowed, a vacuum was pulled, and the cone-and-plate viscosity was monitored (150° C.). The molten glycidoxy polyester was poured into a foil-lined tray and broken into pieces suitable for use in extrusion. The total process time was about 15 hours.

Melt Blend Products and Dispersion Preparation

Various ratios of the polypropylene copolymer (PPMah) and the polyester (with or without the epoxy silane-polyesters 1-4), as indicated in Table 1, were mixed together. These mixtures were fed into the feed throat of the extruder. The rest of the feed and processing conditions are given in Table 1. Upon leaving the extruder, the molten extrudates were collected and cooled. The solid extrudate was broken and converted into a dispersion using the following method: extrudate (3 parts), 1:1 solvent blend of mono-propylene glycol methyl ether acetate, PMA and Solvesso 100 (27 parts), were placed inside a lidded glass jar. The jar was placed in an ultrasonication water bath at 70° C. and was subjected to ultrasound treatment for about 30 minutes. The product was allowed to cool to room temperature. The contents of the jar were filtered through a muslin cloth filter and the filtered product was analyzed using a Malvern Mastersizer 2000 instrument to establish the mean particle size of the resulting polymer dispersion.

TABLE 1

| | | Dispersion Preparation and Particle Size Data | | | | |
|---|---|---|---|---|---|---|
| Compositions | Ratio of polymers and (feed rate) | Extruder screw speed (rpm) | Extrusion melt temp. (° C.) | Melt blending temp. (° C.) | Producte xit temp. (° C.) | Mean particle size (μm) |
| 1. Melt blending of PPMah with a pre-made | PPMah/ Polyester 4: 30/70 | 200 | 210 | 190 | 170 | 5.9 |

TABLE 1-continued

Dispersion Preparation and Particle Size Data

| Compositions | Ratio of polymers and (feed rate) | Extruder screw speed (rpm) | Extrusion melt temp. (° C.) | Melt blending temp. (° C.) | Producte xit temp. (° C.) | Mean particle size (μm) |
|---|---|---|---|---|---|---|
| silane functionalized polyester | (1.70 kg/hr) | | | | | |
| 2. Control 1 - Melt blend of PPMah with a hydroxyl-functional polyester without epoxy silane | PPMah/ Polyester 1: 30/70 (1.7 kg/hr) | 200 | 230 | 200 | 170 | 8.6 |
| 2A. As composition 2 but with the inclusion of epoxy silane | PPMah/ Polyester 1/ Epoxy Silane: 30/70/3 (1.7 kg/hr) | 200 | 230 | 200 | 170 | 6.4 |
| 3. Control 2 - Melt blending of PPMah with acid-functional polyester without epoxy silane | PPMah/ Polyester 2: 30/70 (1.50 kg/hr) | 200 | 200 | 190 | 170 | 16.9 |
| 3A. As composition 3 but with epoxy silane | PPMah/ Polyester 2/ Epoxy Silane: 30/70/3 (1.50 kg/hr) | 200 | 200 | 190 | 170 | 7.0 |
| 4. Melt blending of PPMah with a hydroxyl-functional polyester and epoxy silane | PPMah/ Polyester/ epoxy silane: 30/70/3 (1.50 kg/hr) | 200 | 200 | 190 | 170 | 6.0 |

As can be seen from Table 1, the dispersions of control compositions 2 and 3 have a higher mean particle size than the respective compositions 2A and 3A with epoxy silane (according to the invention). Low mean particle size is desired for the dispersions. Composition 3 results in a dispersion with the mean particle size of 16.9 μm, which is unacceptable for the intended application.

Example 2

Coating Compositions

Physical and chemical properties of the commercial dual coating system of the epoxy-based Vitalure 325 and Vitalure 326 (both available from AkzoNobel) were compared with a single coating system prepared according to the present invention containing the polyester polymer Dynapol L651 commercially available from Evonik. Dynapol L651 was extruded with Fusabond P613 available from Dupont at a 70:30 ratio. The extrudate was dispersed in a 50:50 mixture of Solvesso 100 and (mono)propylene glycol methyl ether acetate (PMA) to form a 30 wt. % dispersion of Dynapol L651:Fusabond P613. A phenolic resin and a phosphoric acid catalyst were added to the dispersion. The coating compositions were coated on ETP steel as a single layer and dried at 200° C. for 8 minutes at peak metal temperature (PMT). The results are shown in the Tables below.

TABLE 2

| | Vitalure 325 + 326 | Acc. to invention |
|---|---|---|
| Film weight dry | 8 + 14 g/m$^2$ | 16 g/m$^2$ |
| Dry content | 32.5% + 50.5% | >35% |
| Viscosity, ISO6 25° C. | 60 s + 72 s | 23 s |
| Intercoat adhesion | Good | Not applicable but adhesion to substrate was good |
| Taste | No taste | No taste |

Viscosity is measured using a flow cup measurement according to ISO using a 6 mm cup at 25° C. The taste is evaluated using distilled water after it was in contact with coated samples for a defined period, by a human test panel.

TABLE 3

| | Vitalure 325 + 326 | Acc. to invention |
|---|---|---|
| WB // (mm) | 102 | 100 |
| WB ⊥ (mm) | 98 | 107 |
| MEK DR | 9 | 7-12 |

Table 3 shows the results of flexibility and solvent resistance tests of the coatings. Flexibility is evaluated by bending wedges and measuring wedge bend (WB) in parallel (//) or perpendicular (⊥) directions to the metal grain.

The wedge bend test is conducted to determine the flexibility of the coating. This is done after ageing of the panels for 5 days at room temperature. The width in millimeters of the crackfree surface is measured.

The solvent resistance test is done by counting the number of double rubs (forwards and back) necessary to remove the coating down to the metal. Rubbing is carried out with a piece of cotton wool soaked in a solvent (methyl ethyl ketone). The result is reported as a number of double rubs.

Table 3 shows that the single layer coating according to the invention has a comparable wedge bend and number of double rubs to the comparative coating of two layers.

TABLE 4

|  | Vitalure 325 + 326 | Acc. to invention |
|---|---|---|
| Asymmetric box | A1 A4 Sh | A1 A4 Sh |
| NaCl 3% | 1 ⅓ 1 | 2 1 1 |
| Acetic acid 3% | 1 1 1 | 1 1 1 |
| Citric acid 3% | 1 ½ 1 | 1 1 1 |
| Lactic acid 2% | 1 4 1 | 2 2 1 |

Table 4 presents the results of chemical resistance tests with a coated asymmetric box. The coated box is immersed into aqueous solutions with the indicated concentration of common food simulants. The damage on the coating is evaluated at pre-determined positions. Angle 1 (A1), Angle 4 (A4) and Shoulder (Sh) of the asymmetric box, after 60 min of exposure. "1" means no damage, higher numbers indicate damaged surface. ⅓ and ½ indicate that, respectively, ⅓ and ½ of the surface shows damage.

TABLE 5

|  | Vitalure 325 + 326 | Acc. to invention |
|---|---|---|
| Before (mA) | 1.00 | 0.49 |
| After NaCl 1% After (mA) | 1.00 | 0.97 |

Table 5 shows the results of porosity tests.

Detection of pores and micro-cracks in coated can ends. The amount of electrical current flowing is inversely proportional to the insulating capacity of a coating. Hence, a lower current indicates a lower degree of porosity. Can ends are stamped out at room temperature (20° C.) of a flat panel which has aged at room temperature (20° C.) for 5 days. A 1% NaCl solution is used as electrolyte. The electrical current flowing (in mA) is recorded before and after subjecting the coating to the electrolyte.

The results show that the coating according to the invention has a comparable or lower porosity than the two-layer comparative coating.

From the above results it can be concluded that the overall performance of the single layer coating according to the invention is as good as that of the comparative two-layer coating.

The invention claimed is:

1. An organic solvent-based coating composition comprising
    a) an organic solvent-based dispersion comprising a melt-blended network of particles of an epoxy-functional and/or amino-functional polymer having a polymer-O—Si—O-polymer linkage and a polyolefin (co)polymer having carboxylic acid and/or carboxylic acid anhydride groups obtained by,
        i) forming the melt-blended network from a prepolymer, a silane-functional compound and the polyolefin (co)polymer in the absence of a solvent,
        ii) mixing the melt-blended network with an organic solvent to make the organic solvent-based dispersion, and
        iii) cooling the organic solvent-based dispersion,
    b) a film-forming polymer,
    c) a crosslinker, and
    d) an acid catalyst;
    wherein the film-forming polymer is a polyester.

2. A coating composition according to claim 1, wherein the coating composition is substantially free of Bisphenol A, Bisphenol F, and aromatic glycidyl ethers.

3. The coating composition according to claim 1, wherein the acid catalyst comprises phosphoric acid.

4. The coating composition according to claim 1, wherein the mean particle size of the melt-blended network particles is from 4 to 6 µm.

5. The coating composition according to claim 1, wherein the crosslinker is a phenolic resin.

6. A metal substrate coated with a coating composition according to claim 1.

7. The metal substrate according to claim 6, wherein the organic solvent-based coating composition is the only coating composition applied directly or indirectly to the metal substrate and is cured to produce the coated metal substrate.

8. The metal substrate according to claim 6, wherein the metal substrate is an easy-open end for a food or beverage container.

9. The organic solvent-based coating according to claim 1, wherein i) is performed by simultaneously melt blending the prepolymer, the polyolefin (co)polymer and the silane-functional compound to form the melt-blended network.

10. The organic solvent-based coating according to claim 1, wherein the silane-functional compound comprises an epoxy-silane-functional compound.

11. The organic solvent-based coating according to claim 1, wherein the epoxy-functional silane compound comprises a diethoxysilane compound.

12. The organic solvent-based coating according to claim 1, wherein the silane-functional compound comprises an amino-silane-functional compound.

13. The organic solvent-based coating according to claim 1, wherein the prepolymer is a polyester comprising a cyclic diol as building block.

14. The organic solvent-based coating according to claim 1, wherein the melt blending is performed at a temperature in the range 100-250° C. in an extruder.

* * * * *